(12) United States Patent
McClure et al.

(10) Patent No.: US 8,997,234 B2
(45) Date of Patent: Mar. 31, 2015

(54) SYSTEM AND METHOD FOR NETWORK-BASED ASSET OPERATIONAL DEPENDENCE SCORING

(75) Inventors: Stuart McClure, Ladera Ranch, CA (US); Michael Morgan Price, San Ramon, CA (US)

(73) Assignee: McAfee, Inc., Santa Clara, CA (US)

( * ) Notice: Subject to any disclaimer, the term of this patent is extended or adjusted under 35 U.S.C. 154(b) by 1 day.

(21) Appl. No.: 13/192,214

(22) Filed: Jul. 27, 2011

(65) Prior Publication Data
US 2013/0031634 A1    Jan. 31, 2013

(51) Int. Cl.
| G06F 11/00 | (2006.01) |
|---|---|
| H04L 29/06 | (2006.01) |
| H04L 12/24 | (2006.01) |
| G06F 21/55 | (2013.01) |
| G06F 12/14 | (2006.01) |

(52) U.S. Cl.
CPC ........ *H04L 63/1425* (2013.01); *H04L 41/5035* (2013.01); *H04L 41/147* (2013.01); *G06F 21/552* (2013.01)
USPC ................................ 726/25; 726/14; 726/23

(58) Field of Classification Search
CPC . G06F 21/552; H04L 41/147; H04L 41/5035; H04L 63/1425
USPC .......................................................... 726/25
See application file for complete search history.

(56) References Cited

U.S. PATENT DOCUMENTS

| 5,987,610 | A | 11/1999 | Franczek et al. |
|---|---|---|---|
| 6,073,142 | A | 6/2000 | Geiger et al. |
| 6,460,050 | B1 | 10/2002 | Pace et al. |
| 7,506,155 | B1 | 3/2009 | Stewart et al. |
| 2003/0046128 | A1 | 3/2003 | Heinrich |
| 2005/0010821 | A1* | 1/2005 | Cooper et al. ................ 713/201 |
| 2005/0154733 | A1 | 7/2005 | Meltzer et al. |

(Continued)

FOREIGN PATENT DOCUMENTS

WO    2013/016577 A1    1/2013

OTHER PUBLICATIONS

International Search Report and Written Opinion from International Application No. PCT/US2012/048402 mailed Dec. 20, 2012.

(Continued)

*Primary Examiner* — Ashok Patel
*Assistant Examiner* — Gary Gracia
(74) *Attorney, Agent, or Firm* — Patent Capital Group

(57) ABSTRACT

A system and method in one embodiment includes modules for identifying an asset with a vulnerability risk, identifying a service running on a port on the asset, identifying a connection to the port, calculating an operational dependence role of the asset as a function of the service and the connection, and modifying the vulnerability risk based on the operational dependence role. Other embodiments include identifying a protocol of a data packet at the port, classifying the protocol into a protocol category with a protocol importance score, calculating a connection average for the asset, classifying the connection average into a connection category with a connection score, and calculating a service dependence score. Other embodiments include calculating a host dependence score, assigning a data importance score to data communicated by the asset, and calculating the operational dependence role as a function of the host dependence score and data importance score.

20 Claims, 5 Drawing Sheets

(56) References Cited

U.S. PATENT DOCUMENTS

| | | | |
|---|---|---|---|
| 2007/0064617 A1* | 3/2007 | Reves | 370/252 |
| 2007/0067845 A1* | 3/2007 | Wiemer et al. | 726/25 |
| 2007/0067846 A1* | 3/2007 | McFarlane et al. | 726/25 |
| 2007/0169194 A1* | 7/2007 | Church et al. | 726/23 |
| 2007/0180526 A1* | 8/2007 | Copeland, III | 726/23 |
| 2007/0283007 A1* | 12/2007 | Keir et al. | 709/224 |
| 2008/0027841 A1 | 1/2008 | Eder | |
| 2008/0294770 A1* | 11/2008 | Jackson et al. | 709/224 |
| 2008/0303689 A1* | 12/2008 | Iverson | 340/825.36 |
| 2009/0044270 A1 | 2/2009 | Shelly et al. | |
| 2009/0077666 A1* | 3/2009 | Chen et al. | 726/25 |
| 2009/0271863 A1* | 10/2009 | Govindavajhala et al. | 726/23 |
| 2009/0307769 A1* | 12/2009 | Curnyn | 726/22 |
| 2010/0043074 A1* | 2/2010 | Scates | 726/25 |
| 2010/0106752 A1* | 4/2010 | Eckardt et al. | 707/805 |
| 2010/0125900 A1* | 5/2010 | Dennerline et al. | 726/13 |
| 2010/0162396 A1* | 6/2010 | Liu et al. | 726/23 |
| 2011/0055921 A1* | 3/2011 | Narayanaswamy et al. | 726/22 |
| 2011/0099559 A1 | 4/2011 | Kache | |
| 2011/0125758 A1 | 5/2011 | Basso | |
| 2011/0138471 A1* | 6/2011 | Van De Weyer et al. | 726/25 |
| 2011/0141915 A1* | 6/2011 | Choi et al. | 370/242 |
| 2011/0239303 A1* | 9/2011 | Owens, Jr. | 726/25 |
| 2011/0277034 A1* | 11/2011 | Hanson | 726/25 |
| 2012/0096010 A1* | 4/2012 | Schwartz et al. | 707/748 |
| 2012/0131213 A1* | 5/2012 | Jiang et al. | 709/228 |
| 2012/0233698 A1* | 9/2012 | Watters et al. | 726/25 |

OTHER PUBLICATIONS

International Preliminary Report on Patentability in International Application No. PCT/US2012/048402, mailed on Jan. 28, 2014, 9 pages.

* cited by examiner

SYSTEM AND METHOD FOR NETWORK-BASED ASSET OPERATIONAL DEPENDENCE SCORING

TECHNICAL FIELD

This disclosure relates in general to the field of computer networks and, more particularly, to a system and a method for network-based asset operational dependence scoring.

BACKGROUND

The field of computer network administration and support has become increasingly important and complicated in today's society. Computer network environments are configured for virtually every enterprise or organization, typically with multiple interconnected computers (e.g., end user computers, laptops, servers, printing devices, etc.). In many such enterprises, Information Technology (IT) administrators may be tasked with maintenance and control of the network environment, including executable software files on hosts, servers, and other network computers. As the number of executable software files in a network environment increases, the ability to control, maintain, and remediate these files efficiently can become more difficult. In addition, networks may have vulnerabilities that hackers may use to compromise secure information stored on web servers and related networked devices. In an organization with millions of computers and other network devices, remediating these files and computer systems generally can use up considerable resources and time. Generally, greater number of computers on a network translates into greater difficulty in managing and remediating vulnerabilities on the computer, for example when computer systems are configured for operational dependence upon other computer systems within an organization. Thus, innovative tools are needed to assist IT administrators in the effective and efficient remediation of computers within computer network environments.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method in one embodiment includes identifying an asset with a vulnerability risk, identifying a service running on a port on the asset, identifying a connection to the port, calculating an operational dependence role of the asset as a function of the service and the connection, and modifying the vulnerability risk based on the operational dependence role. More specific embodiments include identifying a protocol of a data packet at the, classifying the protocol into a protocol category with a corresponding protocol category score, calculating a connection average for the asset, classifying the connection average into a connection category with a corresponding connection score, and calculating a service dependence score as a function of the connection score and the protocol score. Other embodiments include calculating a service dependence score for each service running on the asset, sorting the service dependence scores, calculating a host dependence score as a function of the service dependence scores, assigning a data importance score to data communicated by the asset, and calculating a role as a function of the host dependence score and data importance score. More specific embodiments include calculating service dependence scores for a plurality of ports, and other features.

EXAMPLE EMBODIMENTS

Figure 1:
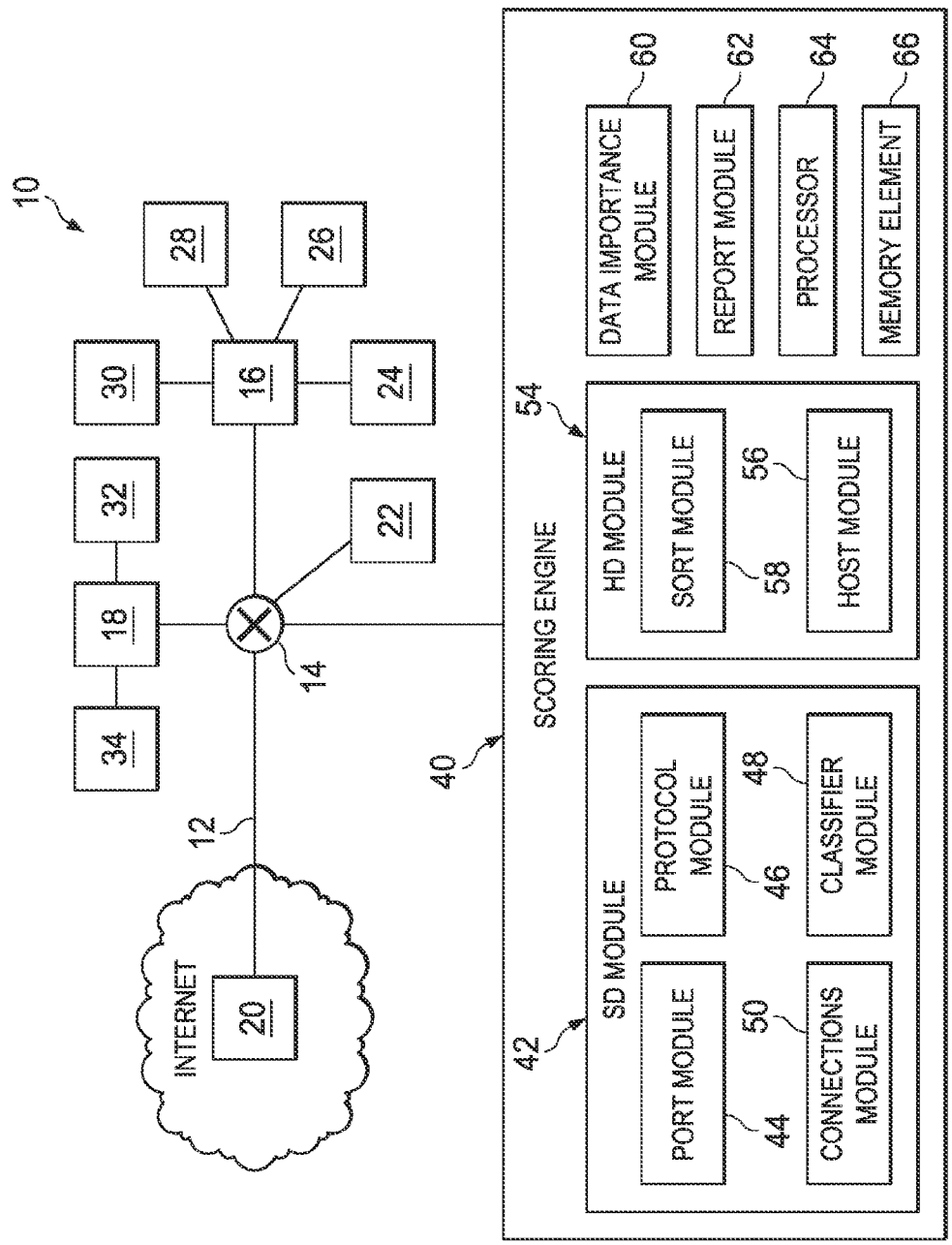
FIG. 1 is a simplified block diagram illustrating components of a system for network based asset operational dependence scoring according to an example embodiment.

FIG. 1 is a simplified block diagram illustrating an example implementation of a system 10 for network-based asset operational dependence scoring. The exemplary network environment illustrates a computer network 12 comprising a switch 14 connecting assets 16, 18, 20 and 22. In example embodiments, asset 16 may be a file server to which devices 24, 26, 28 and 30 may be connected. Asset 18 may be a gaming server connecting devices 34 and 32. Asset 20 may be a web server connected to an Internet cloud. In an example embodiment, asset 20 may be remotely accessed by other assets on network 12, for example, assets 16, 18 and 22 through suitable hardware and software components. Asset 20 may communicate with numerous clients at any time, including third party clients on other networks' end user computers accessing information on asset 20 via the Internet cloud. Asset 22 may be a network printer. Scoring engine 40 may be connected to switch 14 and configured to passively monitor and analyze network traffic over network 12 for purposes of scoring network-based asset operational dependence as part of a network vulnerability assessment.

According to embodiments of the present disclosure, scoring engine 40 may comprise a service dependence (SD) module 42, which may include a port module 44, a protocol module 46, a classifier module 48, and a connections module 50. Scoring engine 40 may also comprise a host dependence (HD) module 54, including a host module 56, and a sort module 58. Scoring engine 62 may also comprise a data importance module 60, a report module 62, one or more processors 64, and one or more memory elements 66.

Scoring engine 40 may monitor network traffic to determine operational dependence of assets on network 12. As used herein, the term, "operational dependence" encompasses dependence of some systems on other systems in a computer network. As used herein, the term "assets" encompasses any device, element, or object configured with an Internet Protocol (IP) address on a network and capable of exchanging electronic data. Assets with numerous dependents may be treated as "more important" assets, because impact to the organization may be greater as a result of disruption in service or other compromise/disruption to the asset. For example, web server 20, with numerous Internet clients, may be more important than printer 22, which does not have any dependents/clients. If web server 20 is rendered inoperative as a result of computer hacking, there is greater disruption to the organization than if printer 22 is hacked. The importance of assets may also depend on network services that run on the assets and the operational dependency that results from such services. As used herein, the term "network service" includes any type of application installed on a network element (e.g., server, network appliance, etc.) that provides shared resources to client computers. For example, file server 16 may be more important to the organization than game server 18, which merely supports a gaming function, as file server 16 may provide file sharing network services that are of higher importance than gaming function network services. If file server 16 is rendered inoperative as a result of computer hacking there may be a greater financial impact and other disruption consequences to the organization than if game server 18 is hacked.

Thus, operational dependence of an asset may provide information relevant to relative asset importance, which may be useful in assessing risk to the organization from vulnerabilities of the asset. In particular, assets with the greatest number of dependents and running high demand network services may be the most important assets in an organization's network. Conversely, assets with the smallest number of dependents and running low demand network services may be the least important assets in the network, even if these assets have significant vulnerabilities. For example, if an asset has major vulnerabilities, but no dependents, then its risk (or urgency in terms of fixing) can be reduced relative to another asset with more dependents. Accordingly, an operational dependence score, termed as operational dependence role R, can be used to modify vulnerability risk (or other) values of an asset up or down.

According to embodiments of system 10, scoring engine 40 may monitor network traffic and determine such operational dependence role R of various assets on network 12. Scoring engine 40 may collect various values from network traffic, for example, new connections, source and destination IP addresses, ports, and parts of data being transferred over network 12. These values may be used to identify network assets that use network services. Scoring engine 40 may rank network services according to protocol, usage/volume and/or source address dispersion. Scoring engine 40 may then rank assets as a function of the network services they host. Scoring engine 40 may provide an output comprising a ranked list of assets, for example, ranked from 1-10, by operational dependence role R. This ranking can be used to adjust vulnerability risk scores or other meta data related to assets.

The network environment illustrated in FIG. 1 may be generally configured or arranged to represent any communication architecture capable of electronically exchanging packets. In addition, the network may also be configured to exchange packets with other networks such as, for example, the Internet, or other LANs. Other common network elements (e.g., email gateways, web gateways, routers, switches, load-balancers, firewalls, etc.), may also be provisioned in the network.

For purposes of illustrating the techniques of system 10, it is important to understand the activities and security concerns that may be present in a given network such as network 12 shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typical network environments, both in organizations (e.g., businesses, schools, government organizations, etc.) and in homes include a plurality of computers such as end user desktops, laptops, servers, network appliances, and the like, with each computer having an installed set of executable software. In large organizations, network environments may include hundreds or thousands of computers, which can span different buildings, cities, and/or geographical areas around the world. IT administrators are often tasked with the extraordinary responsibility of maintaining these computers and their software in a way that minimizes or eliminates disruption to the organization's activities.

One difficulty IT administrators face when managing a network environment is ensuring that only trusted and approved executable software files are present. Although computers in a network may initially be configured with only trusted and approved executable software, continuous efforts (both electronic and manual) are usually necessary to protect against unknown and/or malicious software. In particular, when computers are connected over a network, assessing vulnerabilities in the network may be useful to prevent unauthorized access into valuable network assets.

A vulnerability assessment is a process of identifying, quantifying, and prioritizing (or ranking) vulnerabilities in a system. A network vulnerability assessment exercise typically consists of the following steps: (1) finding all the hosts on the network; (2) fingerprinting their respective operating systems; (3) detecting open ports on the hosts; (4) mapping the ports to various network services; (5) detecting the version of the services; (6) mapping the service version to various discovered security vulnerabilities; and (7) verifying if the service on the host is actually vulnerable to an attack or if it has been patched or remedied with appropriate security patches.

However, IT administrators performing network vulnerability assessment have no way to prioritize what assets, and/or vulnerabilities to fix first. For example, in an organization with a million computers, a network vulnerability assessment may inform IT administrators about the nature of vulnerabilities found, and the location of identified vulnerabilities but not provide a ranking of vulnerabilities according to relative importance of assets in the organization. Therefore, the IT administrator may attempt to remedy vulnerabilities in the million computers in an ad-hoc manner, resulting in inefficient use of time and resources. For example, a relatively unimportant asset may be remediated before a more important asset. Alternatively, the IT administrator may review the network vulnerability assessment report and determine, manually, priorities of assets and a remedy plan. However, such manual assessment is prone to human errors, and can be inefficient. Therefore, there is a need for a system and method for automatically scoring importance of assets in an organization.

A system for network based asset operational dependence scoring outlined by FIG. 1 can resolve many of these issues. Embodiments of the present disclosure can help organizations (and their IT administrators) more effectively remediate their systems by providing an automatic process for evaluating relative importance of assets within the network. Embodiments of system 10 can create value by helping organizations better understand criticality of their assets. For example, organizations may be able to use this information to better respond to incidents. By prioritizing assets with more dependents ahead of other assets for patching/threat response, risk mitigation and remediation can become more efficient and effective.

Ability to determine operational dependence allows for a score to be calculated that can then be used to adjust asset vulnerability risk scores up or down. For example, if an asset is affected by a medium level vulnerability, and if the asset has no dependents, then it is less critical to patch, compared to another asset (everything else being equal) with substantially more dependent systems (e.g. file server versus individual desktop). Embodiments of system 10 may be implemented in conjunction with other risk mitigation products, for example, McAfee® Network Traffic Baseline Analyzer (NTBA), as part of another network traffic analysis product (e.g., network based intrusion prevention systems (NIPS)), as a standalone component or as a distributed application through the use of agents installed on end points in the network for example, via McAfee® ePolicy Orchestrator (ePO).

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Turning to the infrastructure of FIG. 1, the example network environment may be configured as one or more networks in any form including, but not limited to, local area networks (LANs), wireless local area networks (WLANs), metropolitan area networks (MANs), wide area networks (WANs), virtual private networks (VPNs), Intranet, Extranet, any other appropriate architecture or system, or any combination thereof that facilitates communications in a network. In some embodiments, communication links connecting components of system 10 may represent any electronic link supporting a LAN environment such as, for example, cable, Ethernet, wireless technologies (e.g., IEEE 802.11x), ATM, fiber optics, etc. or any suitable combination thereof.

In other embodiments, communication links in system 10 may represent a remote connection, for example, to web server 20, through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet). In addition, gateways, routers, switches, and any other suitable network elements may be used to facilitate electronic communication between assets on network 12. Note that network 12 illustrated in FIG. 1 may include a configuration capable of transmission control protocol/internet protocol (TCP/IP) communications for the transmission and/or reception of packets in the network. Network 12 could also operate in conjunction with a user datagram protocol/IP (UDP/IP) or any other suitable protocol, where appropriate and based on particular needs.

In an example embodiment, assets, for example, assets 24 through 34, may represent end user computers that could be operated by end users. The end user computers may include desktops, laptops, and mobile or handheld computers (e.g., personal digital assistants (PDAs), mobile phones, etc.), or any other type of computing device operable by an end user. It should be noted that the network configurations and interconnections shown and described herein are for illustrative purposes only. FIG. 1 is intended as an example and should not be construed to imply architectural limitations in the present disclosure.

Scoring engine 40 can calculate the operational dependence role R of assets as a function of the network services they host. Scoring engine 40 may rank the assets, for example, from 1 to 10, by the operational dependence role R. For each port on an asset, a service dependence score $S_d$ may be calculated first as an average of connections to the service, factored by the importance of the service (e.g., determined by the importance of protocols in use). A host dependence score $H_d$ may then be calculated as a function of the services running on all the ports on the asset, for example, by using a suitable sum of the service dependence scores $S_d$ for all ports. Finally, the operational dependence role R may be calculated as a function of the host dependence role $H_d$, factored by a 'data importance' score representing the importance of data communicated and/or stored by the asset.

Port module 44 can identify ports on the assets in network 12. A port is an application-specific software construct serving as a communications endpoint in a computer network. A specific port may be identified by its port number, IP address with which it is associated, and a type of transport protocol (e.g., TCP, UDP, etc.). Typically, a well-known range of port numbers is reserved by convention to identify specific service types on a host computer (e.g., port 143 is reserved for Internet Message Access Protocol (IMAP)—management of email messages; port 57 is reserved for Mail Transfer Protocol (MTP), etc.). Thus, each service running on an asset may be configured to a specific port number, which can be identified by port module 44.

For each identified port, protocol module 46 can identify protocols on the port. Classifier module 48 can classify the identified protocol into appropriate protocol categories based on a relative importance of the various protocols (e.g., file transfer protocol (FTP) may be more important to the organization than a post office protocol (POP)). In an example embodiment, protocols may be categorized into the following protocol categories: "important," "ambiguous," and "not important." For example, FTP may be categorized as "important," TCP may be categorized as "ambiguous," and POP may be categorized as "not important." Classifier module 48 may assign a protocol importance score ($P_i$) to each protocol category. For example, "important" may be assigned a $P_i$ of 7, "ambiguous" may be assigned a $P_i$ of 3 and "not important" may be assigned a $P_i$ of 0.

For each identified port, connections module 50 can identify the connections from various clients to the port, and calculate a connection average (i.e., average number of connections to dependent assets). For example, file server 16 may be connected to device 24 via three different connections (e.g., WiFi, USB cable and HDMI cable), and to assets 26, 28 and 30 via single connections; the connection average for file server 16 is 1.5. Connections module 50 may feed the connection average to classifier module 48, which may classify the connection average into various connection categories with corresponding connection scores ($A_v$). For example, connection average may be classified into "low," "medium low," "medium," "medium high," or "high." The classification may be relative to the network and may not be an absolute value. For example, a connection average of 20 may be classified as low in a network with high connectivity, whereas the same connection average may be classified as high in a network with low connectivity. In an example embodiment, "low" is assigned a connection score $A_v$ of 1, "medium low" is assigned a connection score $A_v$ of 3, "medium" is assigned a connection score $A_v$ of 5, "medium high" is assigned a connection score $A_v$ of 7, and "high" is assigned connection score $A_v$ of 10. Averaging of client connections over time may also be implemented, to help further reduce noise or spikes that could result from single, isolated bursts of traffic between hosts.

Scoring engine 40 can calculate the service dependence score $S_d$ for the port under analysis as a function of the protocol importance score $P_i$ and connection score $A_v$. In an example implementation, a weighted sum of $P_i$ and $A_v$ may be used, for example, using weighting factors of 0.8 and 0.2 for $A_v$ and $P_i$, respectively, $$S_d = A_v \times 0.8 + P_i \times 0.2$$

Various other values, and category labels may be assigned to the protocols, connection average and weighting factors, as is evident to one of ordinary skill in the art. The values and category labels may be customized for each organization. For example, a company running a file storage service may rank a FTP protocol as having a higher importance than any other protocols, whereas a web hosting company may provide a higher importance to hyper-text transfer protocol (HTTP).

Host module 56 in host dependence module 54 can identify assets in network 12. Each asset may run one or more network services on respective ports with corresponding service dependence scores $S_d$. Sort module 58 can retrieve the service dependence scores $S_d$ for each port of the asset, and sort the service dependence scores $S_d$, for example, from highest to lowest. Scoring engine 40 can calculate a host dependence score $H_d$ for each asset on network 12 based on service dependence scores $S_d$ of the various ports on the asset. In an example embodiment, an iterative algorithm may be implemented to calculate $H_d$. $H_d$ may be assigned an initial value equal to the highest service dependence score. $H_d$ can be updated for each other service dependence score by appropriately factoring it down, for example, using the following mathematical equation:

$$H_d(k+1) = H_d(k) + (10 - H_d(k))\left(\frac{S_d(k+1)}{10}\right)$$

where k is an iteration number corresponding to the $k^{th}$ service dependence score.

In example embodiments according to the present disclosure, $H_d$ values can be combined with a 'data importance' score to further refine the role or importance of assets within an organization. Data importance module 60 may be used to rate importance of data in the network. According to an embodiment of the present disclosure, data importance module 60 may present a user with a pull-down menu listing categories of data and/or their corresponding data importance scores ($D_i$). For example, the following categories and corresponding scores $D_i$ may be presented: (1) not important: 0; (2) sensitive: 3; (3) confidential: 5; (4) secret: 7; and (5) top secret: 10.

Scoring engine 40 can calculate the operational dependence role R for the asset by a suitable function of $H_d$ and $D_i$. For example, the following equation may be used:

$$\text{Role} = H_d + (10 - H_d)\left(\frac{D_i}{10}\right)$$

In an example, for $H_d$=8.2, and $D_i$=5.0, Role=9.1. Data importance score $D_i$ may be used to mark up $H_d$, but generally may not be used to mark down $H_d$. If $A_i$ scores are unavailable, $A_i$ may be presumed to be 0.

A vulnerability risk of an asset on network 12 may be a numerical value or score representing an assessment of a level of risk of the asset, and may be determined by known methods, for example, using McAfee NTBA. The vulnerability risk for the asset may be marked up or down by the value of the operational dependence role R as determined by scoring engine 40. A vulnerability risk of an important asset may be increased by the operational dependence role R. Similarly, a vulnerability risk of an unimportant asset may be decreased by the operational dependence role R. For example, a vulnerability risk of 10 for an asset with an operational dependence role R of 9.1 may be increased to 19.1, whereas if the asset is unimportant, with an operational dependence role R of 0, its vulnerability risk may not be modified at all.

Report module 62 may present results from analysis by scoring engine 40, for example, vulnerabilities, operational dependence roles and marked up/down risk values of various assets, in any suitable report format. In an example embodiment, report module 62 may present results in two types of reports: (1) executive summary; and (2) IT report. The executive summary report may have a summary of vulnerabilities ranked according to the marked up/down risk assessments and/or asset importance. For example, the executive summary report may provide information at a high level concerning the number of assets with vulnerabilities and the impact of such vulnerabilities to the organization. The IT report may provide detailed information on the issues found in the vulnerability assessment, categorized for each asset and ranked according to operational dependence scores. The information provided in the IT report may assist an IT administrator or other authorized person determine priorities and resource allocation for appropriate remedial action on the assets in the organization.

Scoring engine 40 may be implemented on a computer connected to switch 14. The computer may monitor traffic by various known methods, for example, using network taps. Port mirroring may also be used to obtain traffic information. Alternatively, scoring engine 40 may be configured to capture network traffic passing through switch 14.

Not shown in system 10 of FIG. 1 is hardware that may be suitably coupled to scoring engine 40 in the form of consoles, user interfaces, memory management units (MMU), additional symmetric multiprocessing (SMP) elements, peripheral component interconnect (PCI) bus and corresponding bridges, small computer system interface (SCSI)/integrated drive electronics (IDE) elements, etc. In addition, suitable modems and/or network adapters may also be included for allowing network access by components of system 10. Any suitable operating systems may also be configured in components of system 10 to appropriately manage the operation of hardware components therein. Components of system 10 may include any other suitable hardware, software, components, modules, interfaces, or objects that facilitate the operations thereof. This may be inclusive of appropriate algorithms and communication protocols that facilitate the network based asset operational dependence scoring operations detailed herein. Similarly, assets 18-34 may also be configured with any appropriate processors, memory, and other hardware, software, components, modules, interfaces or objects that facilitate the operations thereof.

These elements, shown and/or described with reference to system 10 are intended for illustrative purposes and are not meant to imply architectural limitations. In addition, each device may include more or less components where appropriate and based on particular requirements. As used herein in this Specification, the term 'computer' is meant to encompass any personal computers, laptops, network appliances, routers, switches, gateways, processors, servers, load balancers, firewalls, or any other suitable device, component, element, or object operable to affect or process electronic information in a network environment.

System 10 may be adapted to provide network based asset operational dependence scoring activities for electronic data, which could be resident in memory of a computer or other electronic storage device. Information related to network based asset operational dependence activities can be suitably rendered, or sent to a specific location, or simply stored or archived, and/or properly displayed in any appropriate format.

Figure 2A:
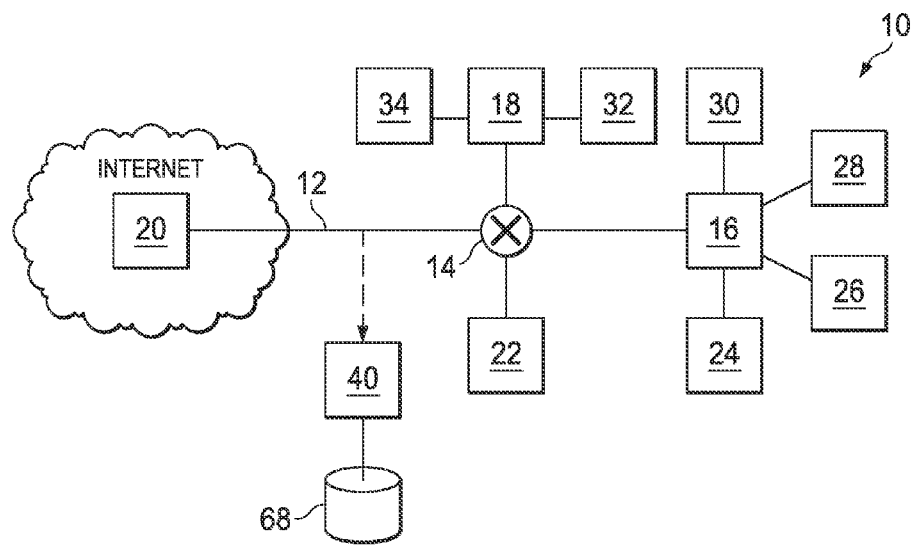
FIGS. 2A and 2B illustrate simplified block diagrams illustrating example embodiments of the system for network based asset operational dependence scoring according to the present disclosure.
Figure 2B:
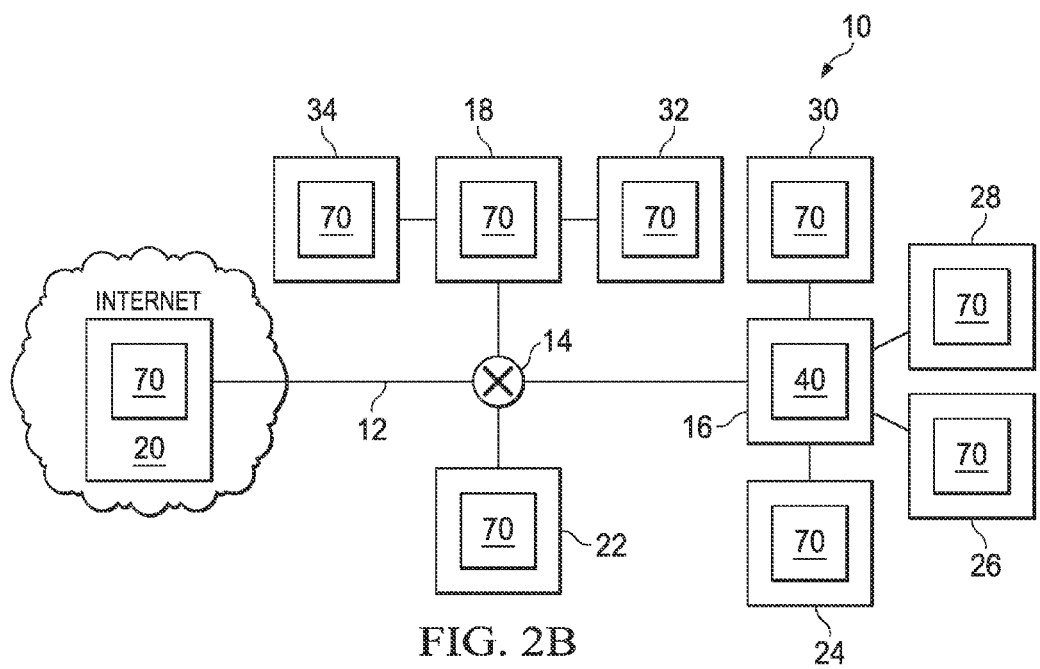

Turning to FIGS. 2A and 2B, FIGS. 2A and 2B illustrates simplified block diagrams showing example configurations of implementing scoring engine 40 according to embodiments of the present disclosure. In FIG. 2A, scoring engine 40 is not directly connected to the network. A network traffic monitoring tool may be used to collect traffic information, including port numbers, connections, protocols, etc., and the traffic information may be fed to scoring engine 40. In an example embodiment, a network monitoring software running on a device, for example, server 18, may capture all the traffic on network 12 and save the information into a file. Scoring engine 40 may be implemented as a software application on a computer unconnected to network 12, and the file with saved traffic information may be loaded onto scoring engine 40, for example, using removable media devices such as CDs or USB flash drives. Scoring engine 40 may process the information, for example, similar to batch processing, and save the results into a database 68. Embodiments as shown in FIG. 2A may be used to post-process traffic information and vulnerability assessments.

In FIG. 2B, agents 70 may reside on end devices, such as printer 22, server 18, computers 24-30 and devices 32 and 34. Agents 70 may be software agents configured to monitor traffic on the devices that they are residing in. For example, agent 70 on printer 22 may monitor traffic on printer 22, but not on other devices. Agents 70 are configured to push traffic-monitoring data to scoring engine 40 residing in a central server, for example, file server 16.

Figure 3:
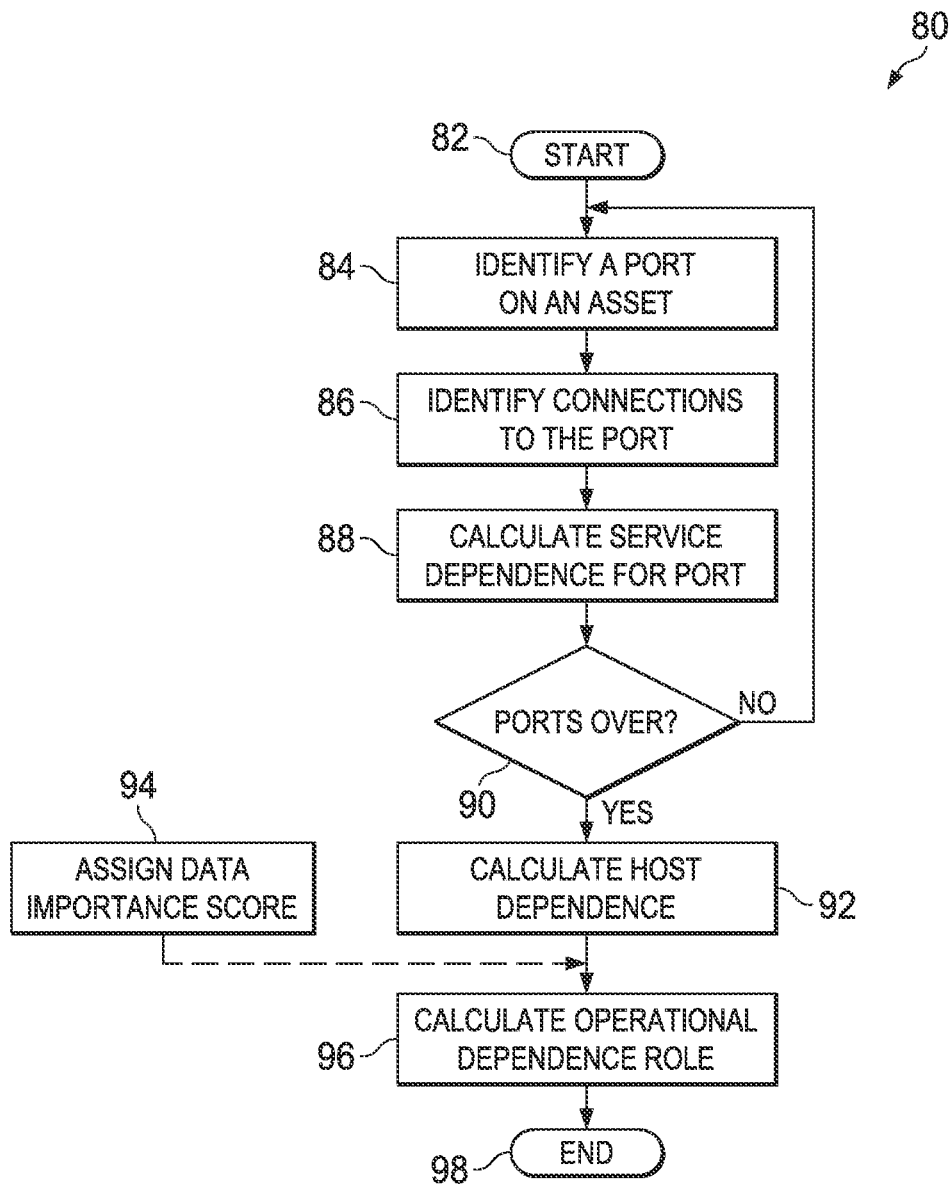
FIG. 3 is a simplified flow-chart illustrating example operational steps that may be associated with an embodiment of the present disclosure.

Turning to FIG. 3, FIG. 3 is a flowchart showing example operational steps that may be associated with a method 80 according to an embodiment of the present disclosure. Method 80 begins in step 82 when scoring engine is activated, for example, by an automatic service provisioning software, or by an IT administrator or other authorized person. In step 84, a port on an asset is identified by port module 44. In step 86, connections to the port are identified by connections module 50. Service dependence module 42 calculates a service dependence score $S_d$ for the port in step 88. In step 90, a determination is made if all the relevant ports in the asset have been analyzed. If there are additional ports to be analyzed, the process loops back to step 84. Otherwise, if there are no more ports to be analyzed (e.g., service dependence scores $S_d$ for relevant ports on the asset have been calculated), host dependence module 54 calculates host dependence score $H_d$ for the asset in step 92. Data importance module 60 may optionally assign a data importance score D, to the data communicated by and/or stored in the asset in step 94. Scoring engine 40 may calculate the operational dependence role R of the asset in step 96. The process terminates in step 98. Dependencies of each asset (e.g., end host) in network 12 could be evaluated using method 80 to determine its operational dependence role, if the dependencies have a vulnerability risk. Thus, method 80 could be performed for every asset (whether it is dependent upon another asset or not) that has a vulnerability risk.

Figure 4:
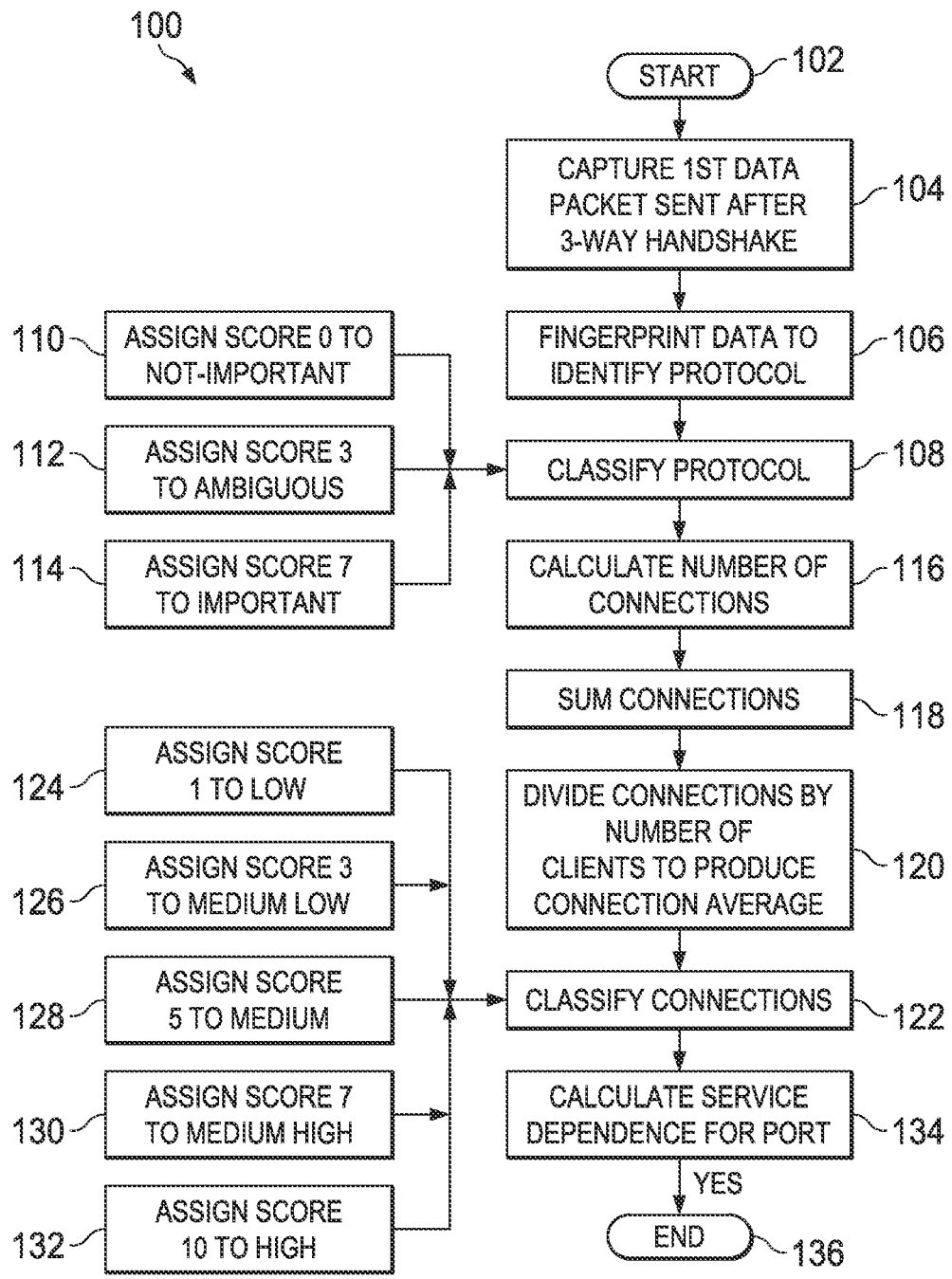
FIG. 4 is a simplified flow-chart illustrating example operational steps that may be associated with determining a service dependence score according to an embodiment of the present disclosure.

Turning to FIG. 4, FIG. 4 is a flow-chart showing additional details of example operational steps that may be associated with a method 100 according to embodiments of the present disclosure. Method 100 begins in step 102 when service dependence module 42 is called by scoring engine 40. In step 104, a first data packet sent after a three way handshake is captured by port module 44 for a port under analysis. For example, to establish a TCP connection, a client may first bind to a port on an asset to open it up for connections. The client may then initiate a three-way handshake with the following steps: (1) client sends a SYN packet to the asset, setting a segment's sequence number to a random value A; (2) in response, the asset replies with a SYN-ACK, setting an acknowledgment number to one more than the received sequence number (i.e., A+1), and chooses a random number B for the packet; and (3) the client sends an ACK back to the asset, with sequence number set to the received acknowledgement value i.e. A+1, and the acknowledgement number is set to one more than the received sequence number i.e. B+1. At this point, both the client and asset have received an acknowledgment of the connection and the three-way handshake is completed.

In step 106, data passing through the port under analysis is fingerprinted by protocol module 46 to identify its protocol. Fingerprinting refers to the process of identifying specific features of a network protocol implementation by analyzing its input/output behaviors. Typically, identifiable features in communication data may reveal specific protocol versions, vender information, and configurable parameters, and can be stored as the "fingerprint" for matching and comparison for any future analysis. In step 108, classifier module 48 classifies the identified protocol into a protocol category with corresponding protocol importance score $P_i$. In an example embodiment, the protocols may be classified into "not important," "ambiguous," and "important." Classifier module 48 may assign a protocol importance score of 0 to a protocol categorized as "not important" in step 110. Classifier module 48 may assign a protocol importance score of 3 to a protocol categorized as "ambiguous" in step 112. Classifier module 48 may assign a protocol importance score of 7 to a protocol categorized as "important" in step 114.

In step 116, connections module 50 may determine a number of connections for each client connected to the port under analysis. In an example embodiment, the number of connections may be determined over time. In step 118, connections module 50 may sum the number of connections. In an example embodiment, connections module 50 may average the number of connections over time. For example, connections module 50 may monitor the number of connections in each of n time intervals $t_0, t_1, \ldots t_n$. Connections module 50 may calculate the total number of connections as the total number of monitored connections divided by n, the number of time intervals. In another embodiment, connections module 50 may take disparity of connection sources into account in determining the number of connections. For example, some connections may be transient, temporary, or insignificant and may be excluded from the computations. Another example is of connections that originate in very important sources, and such connections may be given more weight than others. In step 120, connections module 50 may divide the summed connections by the number of clients to obtain a connection average. Classifier module 48 may classify and assign connection score $A_v$ to the connection average in step 122. In an example embodiment, classifier module 48 may assign a score of 1 to a 'low' connection average in step 124. Classifier module 48 may assign a score of 3 to a 'medium low' connection average in step 126. Classifier module 48 may assign a score of 5 to a 'medium' connection average in step 128. Classifier module 48 may assign a score of 7 to a 'medium high' connection average in step 130. Classifier module 48 may assign a score of 10 to a 'high' connection average in step 132. Scoring engine 40 may calculate service dependence score $S_d$ for the port from $P_i$ and $A_v$ in step 134. The process ends in step 136.

Figure 5:
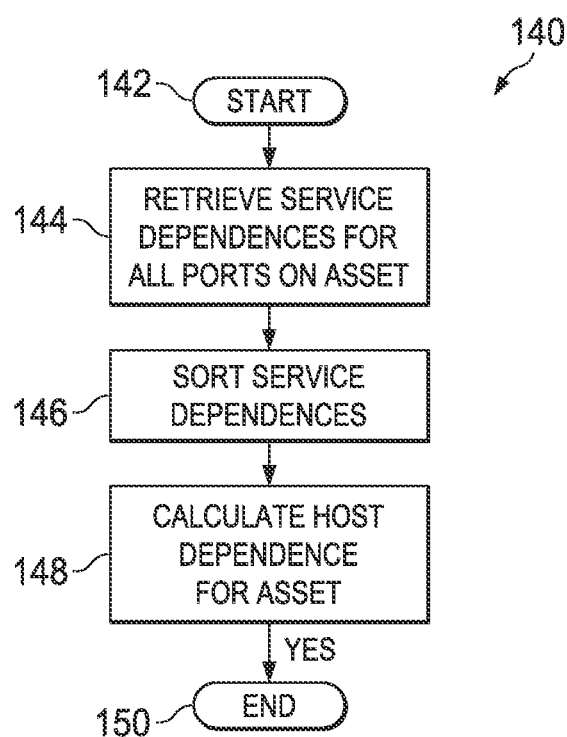
FIG. 5 is a simplified flow-chart illustrating example operational steps that may be associated with determining a host dependence score according to an embodiment of the present disclosure.

Turning to FIG. 5, FIG. 5 is a flowchart showing additional details of example operational steps that may be associated with a method 140 according to an embodiment of the present disclosure. Method 140 starts in step 142, when host dependence module 54 is called by scoring engine 40. In step 144, service dependence score $S_d$ is retrieved by sort module 58 for all ports running on an asset under analysis. In step 146, the service dependence scores $S_d$ are sorted, for example, from highest to lowest by sort module 58. In step 148, host dependence score $H_d$ is calculated by scoring engine 40 as a function of connection score $A_v$ and protocol importance score $P_i$. The process terminates in step 150.

The options for network based asset operational dependence scoring, as shown in FIGURES, are for example purposes only. It will be appreciated that numerous other options, at least some of which are detailed herein in this Specification, may be provided in any combination with or exclusive of the options of the various FIGURES.

Software for achieving the network based asset operational dependence scoring operations outlined herein can be provided at various locations (e.g., the corporate IT headquarters, end user computers, distributed servers in the cloud, etc.). In some embodiments, this software could be received or downloaded from a web server (e.g., in the context of purchasing individual end-user licenses for separate networks, devices, servers, etc.) in order to provide this system for asset operational dependence scoring. In one example implementation, this software is resident in one or more computers and/or web hosts sought to be protected from a security attack (or protected from unwanted or unauthorized manipulations of data).

In various embodiments, the software of the system for network based asset operational dependence scoring in a computer network environment could involve a proprietary element (e.g., as part of a network security solution with McAfee® ePolicy Orchestrator (ePO) software, McAfee® Network Traffic Baseline Analyzer (NTBA) software, network intrusion prevention systems (NIPS) software, other network traffic analysis products, etc.), which could be provided in (or be proximate to) these identified elements, or be provided in any other device, server, network appliance, console, firewall, switch, information technology (IT) device, distributed server, etc., or be provided as a complementary solution, or otherwise provisioned in the network.

In certain example implementations, the network based asset operational dependence scoring activities outlined herein may be implemented in software. This could be inclusive of software provided in scoring engine 40 and in other network elements (e.g., web server 20). These elements and/or modules can cooperate with each other in order to perform the network based asset operational dependence scoring activities as discussed herein. In other embodiments, these features may be provided external to these elements, included in other devices to achieve these intended functionalities, or consolidated in any appropriate manner. For example, some of the processors associated with the various elements may be removed, or otherwise consolidated such that a single processor and a single memory location are responsible for certain activities. In a general sense, the arrangement depicted in FIGURES may be more logical in its representation, whereas a physical architecture may include various permutations, combinations, and/or hybrids of these elements.

In various embodiments, some or all of these elements include software (or reciprocating software) that can coordinate, manage, or otherwise cooperate in order to achieve the network based asset operational dependence scoring operations, as outlined herein. One or more of these elements may include any suitable algorithms, hardware, software, components, modules, interfaces, or objects that facilitate the operations thereof. In the implementation involving software, such a configuration may be inclusive of logic encoded in one or more tangible media, which may be inclusive of non-transitory media (e.g., embedded logic provided in an application specific integrated circuit (ASIC), digital signal processor (DSP) instructions, software (potentially inclusive of object code and source code) to be executed by a processor, or other similar machine, etc.).

In some of these instances, one or more memory elements (e.g., memory 66) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, processor 64 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

System 10 and other associated components in system 10 can include one or more memory elements (e.g., memory 66) for storing information to be used in achieving operations associated with the application assessment as outlined herein. These devices may further keep information in any suitable type of memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.' Each of the computers may also include suitable interfaces for receiving, transmitting, and/or otherwise communicating data or information in a network environment.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of FIGURES may be combined in various possible configurations, all of which are clearly within the broad scope of this Specification. In certain cases, it may be easier to describe one or more of the functionalities of a given set of flows by only referencing a limited number of network elements. It should be appreciated that the system of FIGURES (and corresponding teachings) is readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the operations described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

What is claimed is:

1. A method performed by a scoring engine in a network environment, the method comprising:
   identifying an asset with at least one vulnerability risk;
   identifying at least one service running on at least one port on the asset;
   identifying at least one connection to the at least one port;
   calculating an operational dependence role of the asset as a function of the at least one service and the at least one connection, wherein the operational dependence role indicates a relative importance of the asset in the network environment, wherein calculating the operational dependence role comprises calculating at least (i) a service dependence score for each of one or more ports on the asset as a weighted sum of an average of connections to the service running on the port and a protocol importance of a protocol associated with the port (ii) a host dependence score for the asset as a function of the one or more service dependence scores calculated for each of the one or more ports and (iii) a data importance score representing an importance of data communicated by the asset, wherein the operational dependence role is a function of a summation of the host dependence score and a multiplication of the host dependence score by the data importance score; and
   modifying the vulnerability risk based on the operational dependence role.

2. The method of claim 1, wherein modifying the vulnerability risk comprises marking the vulnerability risk up by the operational dependence role.

3. The method of claim 1, wherein modifying the vulnerability risk comprises marking the vulnerability risk down by the operational dependence role.

4. The method of claim 1, wherein calculating the operational dependence role comprises:
   identifying a protocol of a data packet at the at least one port;
   determining a protocol importance score of the protocol, wherein the protocol importance score comprises a numerical score assigned to the protocol based on a relative importance of the protocol in the network environment;
   calculating a connection average for the asset;
   determining a connection score of the connection average; and
   calculating a service dependence score for the at least one service as a function of the connection score and the protocol importance score.

5. The method of claim 4, wherein the function of the connection score and the protocol importance score is a weighted sum of the connection score and the protocol importance score.

6. The method of claim 4, wherein calculating a connection average comprises:
   identifying a number of connections to the asset over time;
   identifying a number of clients connected to the asset; and
   dividing the number of connections by the number of clients.

7. The method of claim 4, further comprising:
   calculating a respective service dependence score for each service running on the asset; sorting the respective service dependence scores; and calculating the host dependence score as an iterative function of the respective service dependence scores.

8. The method of claim 7, further comprising: assigning the data importance score to the data communicated by the asset; and calculating the operational dependence role as a function of the host dependence score and the data importance score.

9. The method of claim 8, wherein assigning the data importance score comprises presenting to a user a pull-down menu with a plurality of data importance scores.

10. Logic encoded in non-transitory media that includes code for execution and when executed by a processor is operable to perform operations comprising:
    identifying an asset with at least one vulnerability risk;
    identifying at least one service running on at least one port on the asset;
    identifying at least one connection to the at least one port;
    calculating an operational dependence role of the asset as a function of the at least one service and the at least one connection, wherein the operational dependence role indicates a relative importance of the asset in the network environment, wherein calculating the operational dependence role comprises calculating at least (i) a service dependence score for each of one or more ports on the asset as a weighted sum of an average of connections to the service running on the port and a protocol importance of a protocol associated with the port (ii) a host dependence score for the asset as a function of the one or more service dependence scores calculated for each of the one or more ports and (iii) a data importance score representing an importance of data communicated by the asset, wherein the operational dependence role is a function of a summation of the host dependence score and a multiplication of the host dependence score by the data importance score; and modifying the vulnerability risk based on the operational dependence role.

11. The logic of claim 10, wherein calculating the operational dependence role comprises:
identifying a protocol of a data packet at the at least one port;
determining a protocol importance score of the protocol, wherein the protocol importance score comprises a numerical score assigned to the protocol based on a relative importance of the protocol in the network environment;
calculating a connection average for the asset;
determining a connection score of the connection average; and
calculating a service dependence score for the at least one service as a function of the connection score and the protocol importance score.

12. The logic of claim 11, wherein calculating a connection average comprises:
identifying a number of connections to the asset;
identifying a number of clients connected to the asset; and
dividing the number of connections by the number of clients.

13. The logic of claim 11, the processor being operable to perform further instructions comprising:
calculating a respective service dependence score for each service running on the asset;
sorting the respective service dependence scores; and
calculating the host dependence score as an interactive function of the respective service dependence scores.

14. The logic of claim 13, the processor being operable to perform further instructions comprising:
assigning the data importance score to the data communicated by the asset; and
calculating the operational dependence role as a function of the host dependence score and the data importance score.

15. An apparatus comprising:
a memory element configured to store data; and
a computing processor operable to execute instructions associated with the data, including:
identifying an asset with at least one vulnerability risk;
identifying at least one service running on at least one port on the asset;
identifying at least one connection to the at least one port;
calculating an operational dependence role of the asset as a function of the at least one service and the at least one connection, wherein the operational dependence role indicates a relative importance of the asset in the network environment, wherein calculating the operational dependence role comprises calculating at least (i) a service dependence score for each of one or more ports on the asset as a weighted sum of an average of connections to the service running on the port and a protocol importance of a protocol associated with the port (ii) a host dependence score for the asset as a function of the one or more service dependence scores calculated for each of the one or more ports and (iii) a data importance score representing an importance of data communicated by the asset, wherein the operational dependence role is a function of a summation of the host dependence score and a multiplication of the host dependence score by the data importance score; and
modifying the vulnerability risk based on the operational dependence role.

16. The apparatus of claim 15, wherein the apparatus is connected to a network comprising the asset.

17. The apparatus of claim 16, wherein the apparatus is configured to monitor network traffic on the network.

18. The apparatus of claim 15, wherein calculating the operational dependence role comprises:
identifying a protocol of a data packet at the at least one port;
determining a protocol importance score of the protocol, wherein the protocol importance score comprises a numerical score assigned to the protocol based on a relative importance of the protocol in the network environment; calculating a connection average for the asset;
determining a connection score of the connection average; and
calculating a service dependence score for the at least one service as a function of the connection score and the protocol importance score.

19. The apparatus of claim 18, the processor being operable to execute further instructions comprising:
calculating a respective service dependence score for each service running on the asset;
sorting the respective service dependence scores; and
calculating the host dependence score as an iterative function of the respective service dependence scores.

20. The apparatus of claim 19, the processor being operable to execute further instructions comprising:
assigning the data importance score to the data communicated by the asset; and
calculating the operational dependence role as a function of the host dependence score and the data importance score.

* * * * *